US010810497B2

(12) United States Patent
Takeuchi et al.

(10) Patent No.: US 10,810,497 B2
(45) Date of Patent: Oct. 20, 2020

(54) SUPPORTING GENERATION OF A RESPONSE TO AN INQUIRY

(71) Applicant: INTERNATIONAL BUSINESS MACHINES CORPORATION, Armonk, NY (US)

(72) Inventors: Emiko Takeuchi, Tokyo (JP); Daisuke Takuma, Tokyo (JP); Hirobumi Toyoshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 15/064,821

(22) Filed: Mar. 9, 2016

(65) Prior Publication Data
US 2017/0262755 A1    Sep. 14, 2017

(51) Int. Cl.
*G06N 5/02*    (2006.01)
(52) U.S. Cl.
CPC .................... *G06N 5/022* (2013.01)
(58) Field of Classification Search
CPC ........ G06F 17/30654; G06F 17/30684; G06N 5/022
See application file for complete search history.

(56) References Cited

U.S. PATENT DOCUMENTS

| | | | | |
|---|---|---|---|---|
| 9,679,568 | B1* | 6/2017 | Taubman | G10L 15/22 |
| 2007/0294229 | A1* | 12/2007 | Au | G06Q 30/02 |
| 2010/0325107 | A1* | 12/2010 | Kenton | G06Q 30/00 707/723 |
| 2014/0163961 | A1* | 6/2014 | Whitten | G06Q 30/0201 704/9 |
| 2014/0254775 | A1 | 9/2014 | O'Connor et al. | |
| 2014/0314225 | A1 | 10/2014 | Riahi et al. | |
| 2015/0032724 | A1* | 1/2015 | Thirugnanasundaram | G06F 17/30654 707/722 |
| 2017/0206271 | A1* | 7/2017 | Jain | G06F 17/30696 |

FOREIGN PATENT DOCUMENTS

| | | |
|---|---|---|
| JP | 2008167226 A | 7/2008 |
| JP | 2013120547 A | 6/2013 |

OTHER PUBLICATIONS

Shaikh Mostafa Al Masum and Mitsuru Ishizuka, "Integrating Natural Language Understanding and a Cognitive Approach to Textual Emotion Recognition for Generating Human-Like Responses", 2014, ResearchGate, p. 1-6. (Year: 2014).*

Giovanni Pilato, Agnese Augello, and Salvatore Gaglio, "A Modular System Oriented to the Design of Versatile Knowledge Bases for Chatbots", 2012, International Scholarly Research Network ISRN Artificial Intelligence vol. 2012, Article ID 363840, pp. 1-10. (Year: 2012).*

\* cited by examiner

*Primary Examiner* — Kamran Afshar
*Assistant Examiner* — Ying Yu Chen
(74) *Attorney, Agent, or Firm* — Robert C. Bunker

(57) ABSTRACT

A first element is extracted from a pair including a past inquiry and a past response, wherein the first element indicates that the past response shows an understanding of the past inquiry. A model is generated used to estimate a second element in a new inquiry based on the first element, wherein the second element indicates that a new response to the new inquiry shows an understanding of the new inquiry.

16 Claims, 8 Drawing Sheets

| Sentence Element | M | N | Response Example |
|---|---|---|---|
| XYZ installation CD | 2 | 3 | - Thank you for your comment for<br>- We appreciate your comment for |
| startup error | 5 | 5 | Thank you for informing us of |
| ... | ... | ... | ... |

FIG. 5

| Keyword | Template |
|---|---|
| comment | Thank you very much for your comment for <object> |
| inform, information | Thank you for informing us of <object> |
| ... | ... |

FIG. 7

SUPPORTING GENERATION OF A RESPONSE TO AN INQUIRY

BACKGROUND OF THE INVENTION

The present invention relates generally to the field of providing a response to an inquiry, and more particularly to generating the response based on text content of an inquiry.

SUMMARY

Embodiments of the present invention provide systems, methods, and program products for supporting generation of a response to an inquiry. A first element is extracted from a pair including a past inquiry and a past response, wherein the first element indicates that the past response shows an understanding of the past inquiry. A model is generated used to estimate a second element in a new inquiry based on the first element, wherein the second element indicates that a new response to the new inquiry shows an understanding of the new inquiry.

BRIEF DESCRIPTION OF THE DRAWINGS

FIG. 5 depicts an example of an empathy object table created by the model generator, in accordance with an embodiment of the present invention;

FIG. 7 depicts an example of a template map used by the empathy object estimator, in accordance with an embodiment of the present invention.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

Customers' satisfaction with operators of call centers allegedly depends on not only whether or not the operators have solved the customers' problems but also whether or not the operators have shown an understanding of the customers' feelings.

In view of this, the exemplary embodiments may generate, as responses to the customers' inquiries, responses showing an understanding of the customers' feelings. In the following description, one's feeling showing an understanding of the other's feeling is referred to as an "empathy", regardless of whether or not the understanding is based on the one's experience. The generated responses may be used in guidance for the operators or for automated responses provided by automatic response computer systems.

Figure 1:
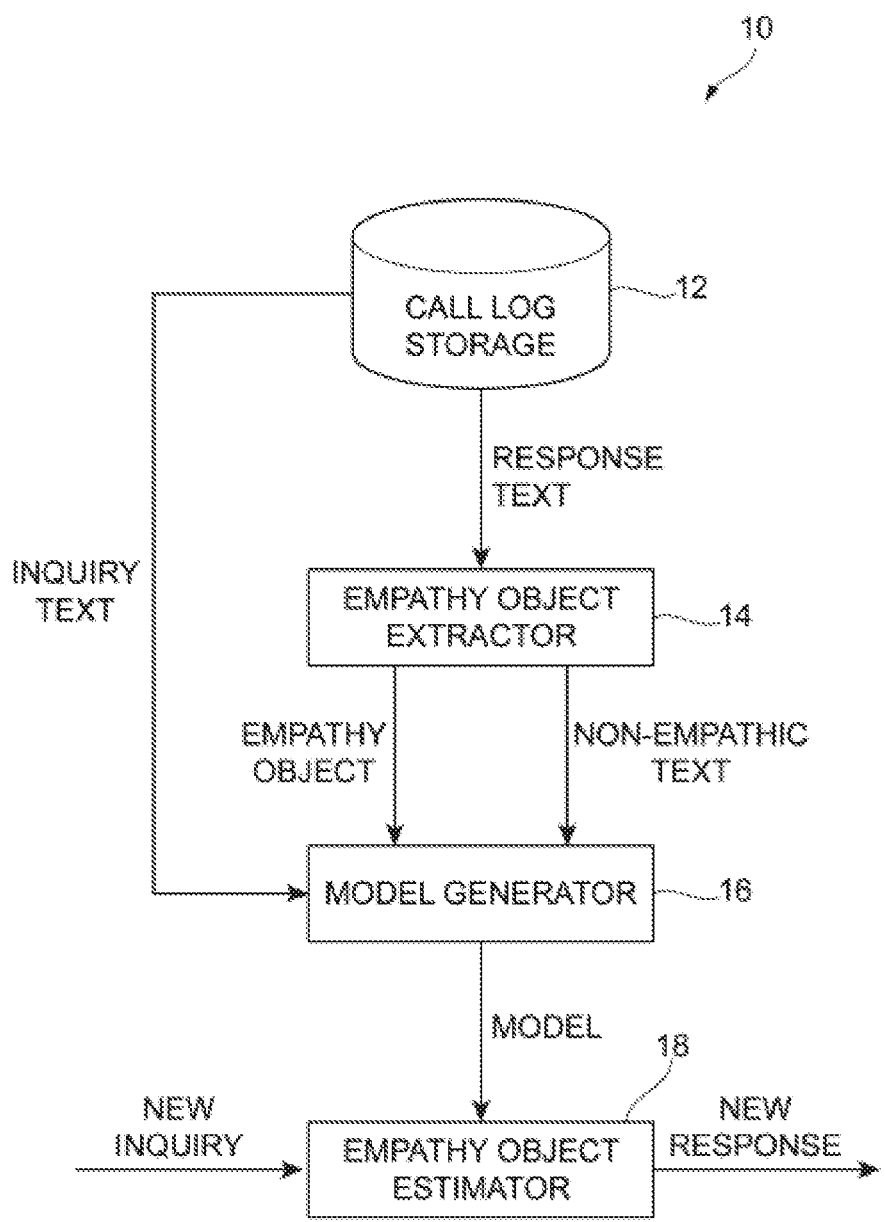
FIG. 1 depicts a block diagram of a response generating device, in accordance with an embodiment of the present invention.

Referring to FIG. 1, depicts a block diagram of a response generating device, in accordance with an embodiment of the present invention. As shown in FIG. 1, the response generating device 10 may include a call log storage 12, an empathy object extractor 14, a model generator 16, and an empathy object estimator 18.

The call log storage 12 may store a past call log data of telephone calls between inquirers and responders. The past call log data may include pairs of inquiry texts based on the inquirers' inquiries and response texts based on the responders' responses. Each of the inquiry texts serves as one example of a previous inquiry, and each of the response texts serves as one example of a previous response. For example, the inquirers may be customers, and the responders may be operators of call centers.

The empathy object extractor 14 may separate each of the response texts stored in the call log storage 12 into two parts, using a predefined pattern. One part of the two parts may include an object of empathy (hereinafter referred to as an "empathy object") of a responder who has made the response. A second part of the two parts may include a "non-empathic text". For example, in a sentence, such as "Thank you for X," "X" may be the empathy object, and "Thank you for" may be the non-empathic text. In this manner, the empathy object extractor 14 may extract empathy objects and non-empathic texts from the response texts. Each of the empathy objects serves as one example of a first element indicating that the past response shows an understanding of the past inquiry, and each of the non-empathic texts serves as one example of a remaining element other than the first element in the past response.

The model generator 16 may generate a model based on the inquiry texts stored in the call log storage 12, and the empathy objects and the non-empathic texts extracted by the empathy object extractor 14. The model may be used to estimate a new empathy object in a new inquiry. The new empathy object serves as one example of a second element indicating that a new response to the new inquiry shows an understanding of the new inquiry.

The empathy object estimator 18 may estimate the new empathy object in the new inquiry, using the model generated by the model generator 16. Then, the empathy object estimator 18 may generate a new response by setting the new empathy object to a field in a template, which is a response sentence having the field to which the new empathy object is to be set.

Figure 2:
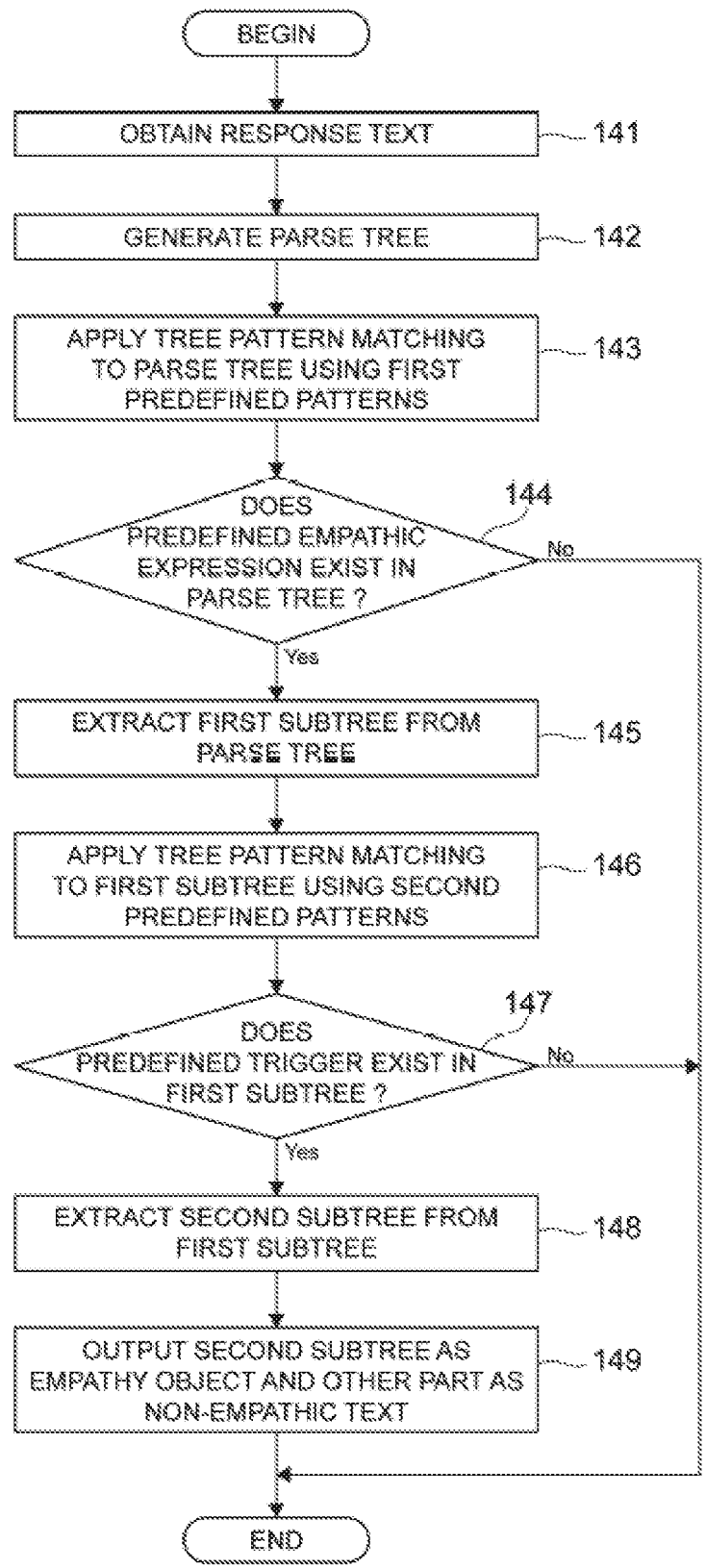
FIG. 2 depicts a flowchart representing an example of an operation of an empathy object extractor, in accordance with an embodiment of the present invention.

Referring to FIG. 2, depicts a flowchart representing an example of an operation of the empathy object extractor 14, in accordance with an embodiment of the present invention. The operation represented in the flowchart is for one response text, and thus may be repeated in a real operation by the number of times equal to the number of the response texts.

The empathy object may correspond to a subtree of a parse tree of a sentence including an empathic expression such as: "Thank you," "appreciate," etc. Thus, the empathy object extractor 14 can extract the empathy object using tree pattern matching. In the following description of FIG. 2, the tree pattern matching is used. In another implementation, other pattern matching, including word sequence pattern matching and string pattern matching, may be used.

Figure 3B:
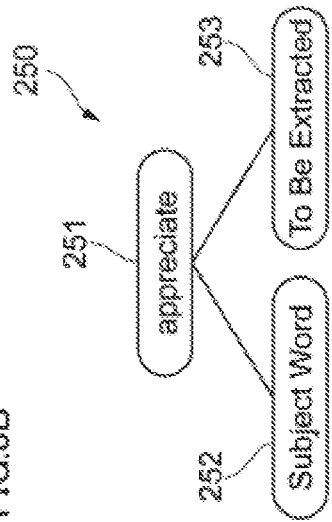
FIGS. 3A-3C depict examples of tree structures used by the empathy object extractor, in accordance with an embodiment of the present invention.
Figure 3C:
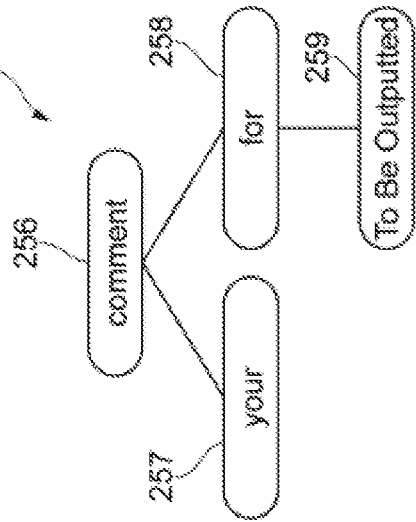
Figure 3A:
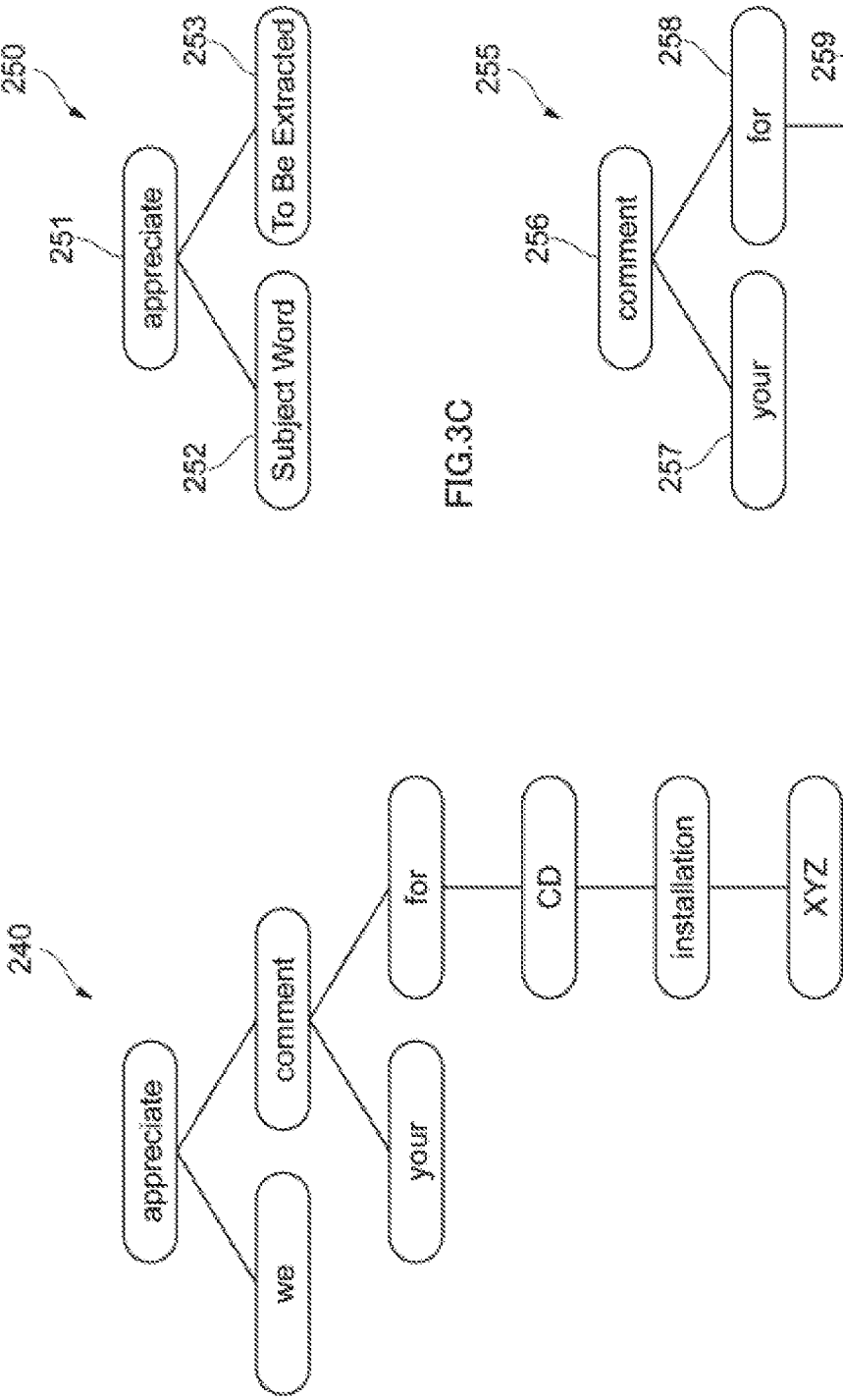

As shown in the FIG. 2, the empathy object extractor 14 may first obtain the response text stored in the call log storage 12 (step 141). Then, the empathy object extractor 14 may generate a parse tree of the response text (step 142). For example, the empathy object extractor 14 is assumed to obtain the response sentence, "we appreciate your comment for XYZ installation CD". FIG. 3A shows a parse tree 240 of the response sentence.

The empathy object extractor 14 may apply tree pattern matching to the parse tree using first predefined patterns (step 143). FIG. 3B shows a pattern 250 of the first predefined patterns. As shown in FIG. 3B, the pattern 250 may include nodes 251 and 252 indicating a predefined empathic expression, and a node 253 indicating a sentence element to be extracted. Then, the empathy object extractor 14 may determine whether or not the predefined empathic expression exists in the parse tree (step 144). If the predefined empathic expression does not exist in the parse tree, the empathy object extractor 14 may end the operation. If the predefined empathic expression exists in the parse tree, the empathy object extractor 14 may extract, from the parse tree, a first subtree corresponding to the sentence element to be extracted indicated by the node 253 (step 145). For example, assuming that the pattern 250 of FIG. 3B is used, the empathy object extractor 14 may determine that a phrase, "we appreciate," exists in the response text, and thus may extract a phrase "your comment for XYZ installation CD" from the response text.

Subsequently, the empathy object extractor 14 may apply tree pattern matching to the first subtree using second predefined patterns (step 146). FIG. 3C shows a pattern 255 of the second predefined patterns. As shown in FIG. 3C, the pattern 255 may include nodes 256 to 258 indicating a predefined trigger, and a node 259 indicating a sentence element to be outputted. Then, the empathy object extractor 14 may determine whether or not the predefined trigger exists in the first subtree (step 147). If the predefined trigger does not exist in the first subtree, the empathy object extractor 14 may end the operation. If the predefined trigger exists in the first subtree, the empathy object extractor 14 may extract, from the first subtree, a second subtree corresponding to the sentence element to be outputted indicated by the node 259 (step 148). For example, assuming that the pattern 255 of FIG. 3C is used, the empathy object extractor 14 may determine that a phrase "your comment for" exists in the response text, and thus may extract a phrase, "XYZ installation CD" from the response text.

After that, the empathy object extractor 14 may output the second subtree as an empathy object and a part of the response text other than the second subtree as a non-empathic text, to the model generator 16 (step 149).

Figure 4B:
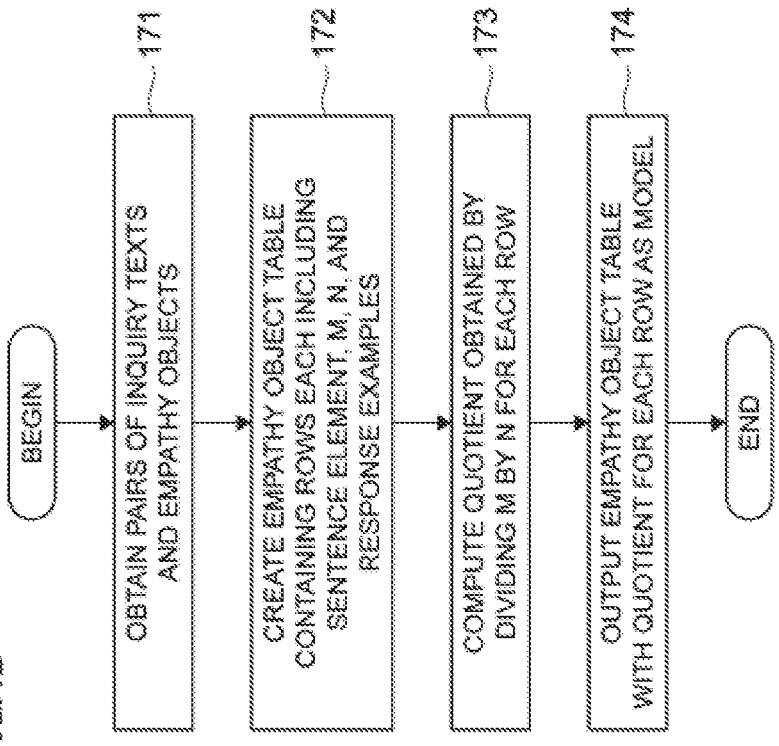
FIGS. 4A and 4B depict flowcharts representing an example of an operation of a model generator, in accordance with an embodiment of the present invention.
Figure 4A:
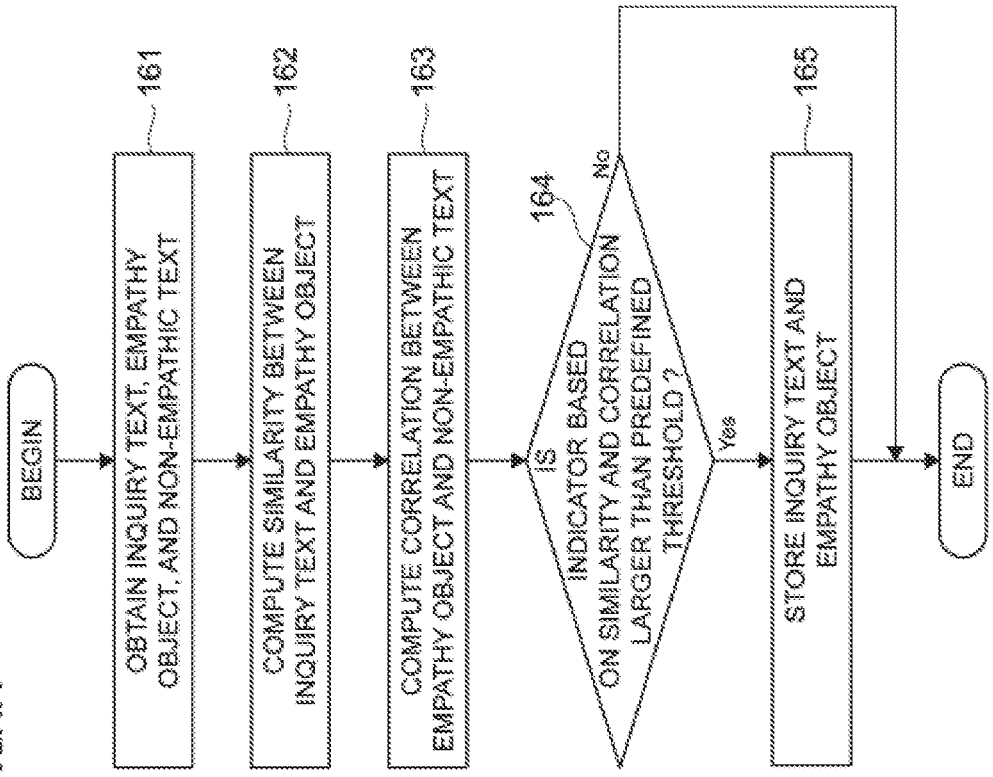

Referring to FIGS. 4A and 4B, depict flowcharts representing an example of an operation of a model generator, in accordance with an embodiment of the present invention.

The empathic expression is classified into two types. One of the two types may be for an inquirer's problem in the past as one example of a past matter of an inquirer. The other of the two types may be for an inquirer's action in the future as one example of a future matter of an inquirer. The exemplary embodiments may be configured to estimate the former empathic expression. Thus, the model generator 16 may first perform an operation of a branching phase shown in the flowchart of FIG. 4A. The operation represented in the flowchart is for one pair of an inquiry text and a response text, and thus may be repeated in a real operation by the number of times equal to the number of the pairs.

As shown in FIG. 4A, the model generator 16 may obtain an inquiry text, an empathy object, and a non-empathic text (step 161). The inquiry text may be read out from the call log storage 12. The empathy object and a non-empathic text may be obtained from the empathy object extractor 14.

Next, the model generator 16 may compute similarity between the inquiry text and the empathy object (step 162). For example, the model generator 16 may compute a cosine similarity between the inquiry text and the empathy object, and may use the cosine similarity as the similarity. The cosine similarity may be a cosine value of an angle made by two vectors. One of the two vectors may have elements which include, at a specific position within the elements, an element corresponding to a specific word and indicating whether or not the specific word appears in the inquiry text. The other of the two vectors may have elements which include, at the specific position within the elements, an element corresponding to the specific word and indicating whether or not the specific word appears in the empathy object.

Note that when computing the cosine similarity, the model generator 16 may use an ontology to compare a part of the empathy object with a part of the inquiry text. In this case, one of the two vectors may have elements which include, at a specific position within the elements, an element corresponding to a category defined by the ontology to include specific words or phrases and indicating whether or not one or more of the specific words or phrases appear in the inquiry text. The other of the two vectors may have elements which include, at the specific position within the elements, an element corresponding to the category and indicating whether or not one or more of the specific words or phrases appear in the empathy object. For example, assuming that the inquiry text is: "The volume button does not work." and the response text is: "Thank you for reporting the issue with the control panel." the above category may be defined by the ontology to include "volume button" and "control panel".

Then, the model generator 16 may compute correlation between the empathy object and the non-empathic text (step 163). For example, the model generator 16 may compute the sum of entropies of respective common words in the empathy object and the non-empathic text, may compute a quotient by dividing the sum of the entropies by the sum of the number of words in the empathy object and the number of words in the non-empathic text, and may use the quotient as the correlation. Each of the entropies may indicate an information amount of a corresponding word by a formula "–log (the probability of the word)". Thus, a rare word may have higher entropy than a frequent word. Alternatively, the model generator 16 may compute cosine similarity between the empathy object and the non-empathic text, and use the cosine similarity as the correlation.

Subsequently, the model generator 16 may determine whether or not an indicator based on the similarity and the correlation is larger than a predefined threshold (step 164). For example, the indicator may be a function which monotonically increases as the similarity increases and monotonically decreases as the correlation increases.

This is because when the responder shows an empathy for an inquirer's problem in the past, the response text tends to include a part of the inquiry text as the empathic object and thus the inquiry text and the empathy object tend to be similar to each other. For example, assume that the model generator 16 obtains an inquiry text: "I have a problem with the login button. It does not work." and a response text:

"Thank you for reporting us the issue of the login button." In this case, the response text shows an empathy for an inquirer's problem in the past and includes an empathy object "login button." Thus, the model generator 16 may determine that the inquiry text and the empathy object are similar to each other.

This is also because when the responder shows an empathy for an inquirer's action in the future, the non-empathic text tends to include an expression indicating the action as the empathic object and thus the empathy object and the non-empathic text tend to be correlated to each other. For example, assume that the model generator 16 obtains an inquiry text: "I dropped the smart phone in water." and a response text: "I would appreciate it very much if you could come to our shop. You can find the nearest shop in our website." In this case, the response text shows an empathy for an inquirer's action in the future and includes an empathy object "shop" in a non-empathic part. Thus, the model generator 16 may determine that the empathy object and the non-empathic text are correlated to each other.

Note that, the indicator may not be based on the correlation but be based on the similarity. For example, the indicator may be a value of the similarity. Alternatively, the indicator may not be based on the similarity but be based on the correlation. For example, the indicator may be a value of the correlation.

If, at step 164, the indicator is not larger than the predefined threshold, the model generator 16 may end the operation. On the contrary, if, at step 164, the indicator is larger than the predefined threshold, the model generator 16 may store the inquiry text and the empathy object (step 165).

After completing storing pairs of inquiry texts and empathy objects by repeating the operation shown in the flowchart of FIG. 4A, the model generator 16 may perform an operation of a learning phase shown in the flowchart of FIG. 4B. The operation represented in the flowchart is for all of the stored pairs of inquiry texts and response texts.

As shown in FIG. 4B, the model generator 16 may obtain pairs of inquiry texts and empathy objects (step 171). Then, the model generator 16 may create an empathy object table 260 containing rows each including a sentence element, a number M, a number N, and response examples (step 172).

FIG. 5 depicts an example of an empathy object table 260 created by the model generator 16, in accordance with an embodiment of the present invention. The sentence element may be a word or a phrase extracted as the empathy object. The number M may be the number of the inquiry texts in which the corresponding sentence element appears as an empathy object, in a preferred exemplary embodiment. In other words, the number M may be the number of pairs of inquiries texts and empathy objects stored at step 165 of FIG. 4A. The number N may be the number of all the inquiry texts in which the corresponding sentence element appears, in a preferred exemplary embodiment. For example, assume that a sentence element "XYZ installation CD" appears three times in the inquiry texts, and appears two times of the three times as an empathy object in the inquiry texts. In this case, the number N may be set to 3, and the number M may be set to 2, as shown in a row 261 of the empathy object table 260. The response examples may include a part of the response text other than the corresponding sentence element.

Next, the model generator 16 may compute a quotient (M/N) obtained by dividing M by N for each row (step 173). The quotient (M/N) may indicate a confidence that the corresponding sentence element is an empathy object. The quotient (M/N) serves as one example of certainty information indicating a certainty that the past response shows an understanding of the past inquiry.

Subsequently, the model generator 16 may output the empathy object table 260 with the quotient (M/N) for each row as a model (step 174). The model may be used to specify new empathy objects, as parameters for the next runtime phase.

That is, after the model has been generated, the empathy object estimator 18 may perform an operation of the runtime phase.

Figure 6:
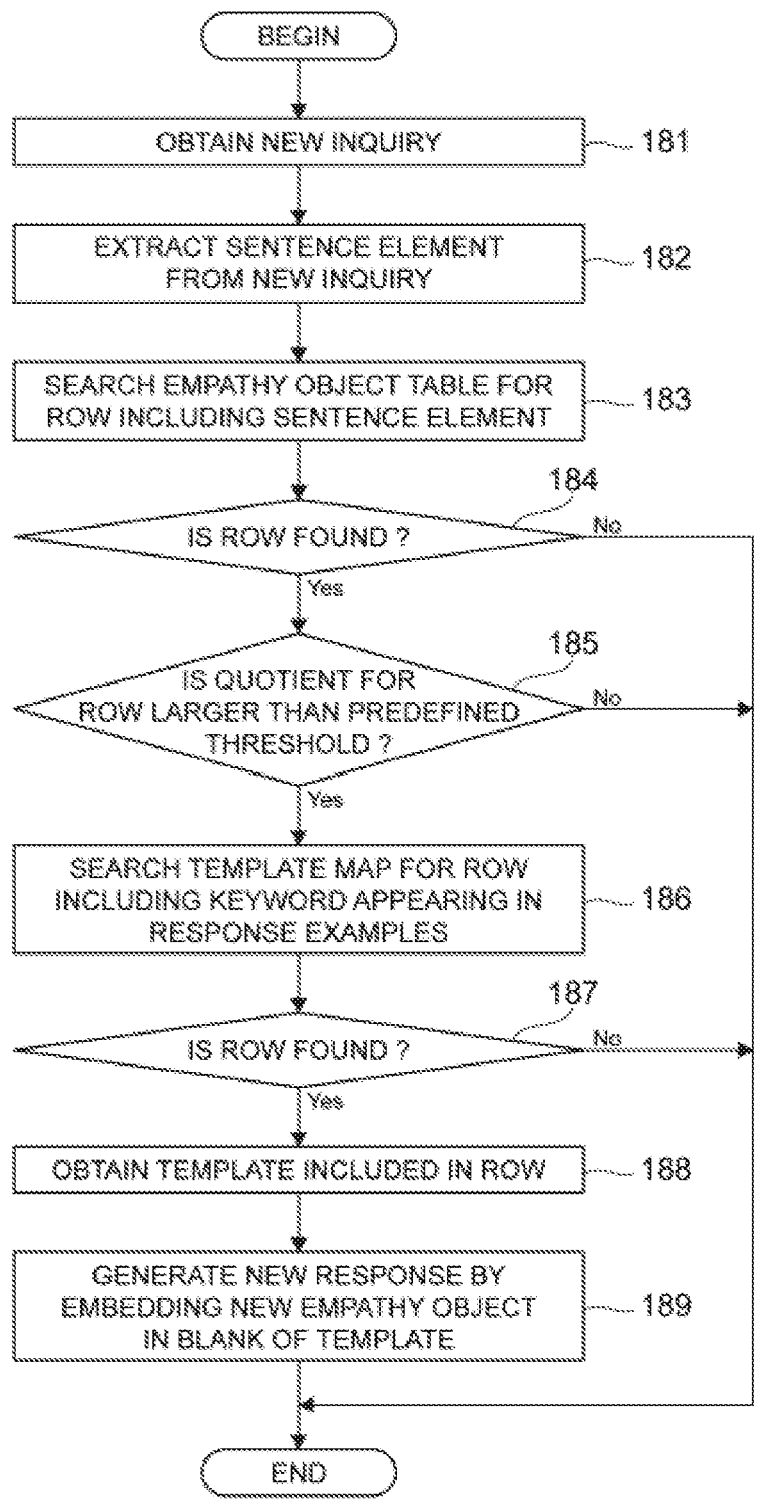
FIG. 6 depicts a flowchart representing an example of an operation of an empathy object estimator, in accordance with an embodiment of the present invention.

Referring to FIG. 6, there is shown a flowchart representing an example of an operation of the empathy object estimator 18 according to the exemplary embodiments.

As shown in FIG. 6, the empathy object estimator 18 may first obtain a new inquiry (step 181). For example, the empathy object estimator 18 may obtain a new inquiry "I got a problem with XYZ installation CD."

Next, the empathy object estimator 18 may extract a sentence element from the new inquiry (step 182). For example, the empathy object estimator 18 may extract a sentence element "XYZ installation CD" from the new inquiry "I got a problem with XYZ installation CD." Then, the empathy object estimator 18 may search the empathy object table 260 for a row including the sentence element (step 183).

Subsequently, the empathy object estimator 18 may determine whether or not the row is found in the empathy object table 260 (step 184). If the row is not found in the empathy object table 260, the empathy object estimator 18 may end the operation. On the contrary, assume that the row is found in the empathy object table 260. For example, assume that the row 261 including the sentence element "XYZ installation CD" is found in the empathy object table 260, as shown in FIG. 5. In this case, the empathy object estimator 18 may further determine whether or not the quotient (M/N) for the row is larger than a predefined threshold (step 185). If the quotient (M/N) is not larger than the threshold, the empathy object estimator 18 may end the operation.

On the contrary, assume that the quotient (M/N) is larger than the threshold. In this case, the sentence element may be regarded as a new empathy object. Then, the empathy object estimator 18 may search a template map 280 for a row including a keyword appearing in the response examples (step 186). FIG. 7 shows an example of the template map 280. The template map 280 may contain rows each including a keyword and a template. The keyword may be a word to identify the corresponding template. The template may be a response sentence having the field to which the new empathy object is to be set. Note that, in FIG. 7, the field is represented by a symbol "<object>".

After that, the empathy object estimator 18 may determine whether or not the row is found in the template map 280 (step 187). If the row is not found in the template map 280, the empathy object estimator 18 may end the operation. On the contrary, assume that the row is found in the template map 280. For example, assume that the empathy object estimator 18 extracts a keyword "comment" from the row 261 of the empathy object table 260 shown in FIG. 5, and the row 281 including the keyword "comment" is found in the template map 280, as shown in FIG. 7. In this case, the empathy object estimator 18 may obtain a template included in the row (step 188). For example, the empathy object estimator 18 may obtain a template "Thank you very much for your comment for <object>" included in the row 281.

Finally, the empathy object estimator 18 may generate a new response by embedding the aforementioned new empathy object in the field of the template (step 189). Thus, a new response may be generated and outputted. For example, a new response "Thank you very much for your comment for XYZ installation CD." may be generated and outputted.

Note that when embedding the new empathy object in the field of the template, the empathy object estimator 18 may use an ontology. In this case, the empathy object estimator 18 may generate a variation of the new response by replacing the new empathy object with a sentence element defined by the ontology to be a superordinate concept of the new empathy object. This sentence element serves as one example of a third element obtained from the second element using an ontology. For example, the empathy object estimator 18 may change a new response "We appreciate your comment for the family discount campaign." to a variation "We appreciate your comment for the discount campaign."

Further, in the exemplary embodiments, the inquiry texts and the response texts may be accompanied with inquiry voice information pieces and response voice information pieces, respectively. Each of the inquiry voice information pieces may include a voice speed and a voice pitch of the inquirer, and each of the response voice information pieces may include a voice speed and a voice pitch of the responder. In this case, the model generator 16 may perform machine learning by using contents of the inquiry texts and the inquiry voice information pieces as explanation variables and the response voice information pieces as objective variables. Then, the empathy object estimator 18 may generate a voice information piece accompanying the new response by an automatic response robot, based on a result of the machine learning.

Next, an alternative exemplary embodiment will be described. In the alternative exemplary embodiment, the model generator 16 may determine whether or not each of the response texts has satisfied the inquirer, and may generate the model prioritizing some response texts which have satisfied the inquirers making the past inquiry. For example, the model generator 16 may perform the following operation in the process of obtaining the numbers M and N at step 172 of FIG. 4B. That is, as regards an inquiry text corresponding to a response text which has satisfied the inquirer, the model generator 16 may increment each of the numbers M and N by 2. As regards an inquiry text corresponding to a response text which has not satisfied the inquirer, the model generator 16 may increment the number N by 1 without incrementing the number M. As regards another inquiry text, the model generator 16 may increment the numbers M and N by 1.

Figure 8:
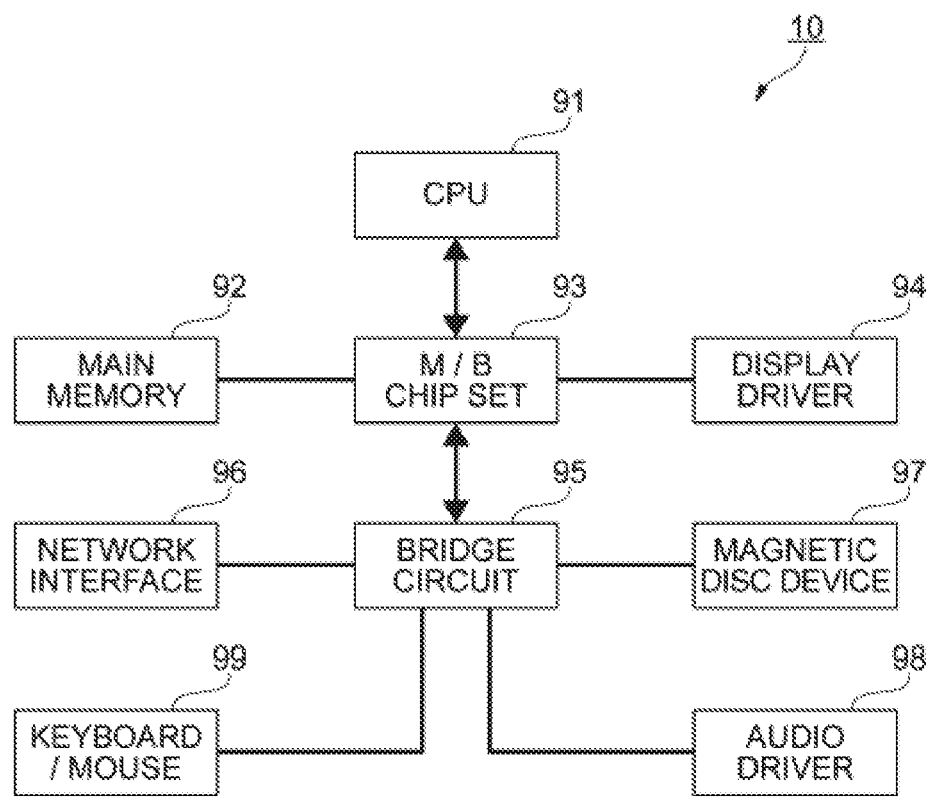
FIG. 8 depicts an example of a hardware configuration of the response generating device, in accordance with an embodiment of the present invention.

Referring to FIG. 8, there is shown an example of a hardware configuration of the response generating device 10 in the exemplary embodiments. As shown in FIG. 8, the response generating device 10 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, magnetic disk device 97, audio driver 98, and keyboard/mouse 99 are also connected to the M/B chip set 93 via a bridge circuit 95.

In FIG. 8, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generation of a response to an inquiry, the method comprising:

extracting, by one or more computer processors, a first element from a pair including a past inquiry and a past response, wherein the first element is an empathy object that indicates that the past response shows empathy for the past inquiry, wherein the past inquiry is from a plurality of past inquiries and the past response is from a plurality of past responses, wherein the past inquiry and the past response each include a voice pitch and a voice speed, and wherein extracting the first element is based, in part, on the voice pitch and voice speed of the past inquiry and the past response;

generating, by one or more computer processors, an empathy object table, wherein a row of the generated empathy object table corresponds with the extracted first element, and wherein the row contains a first field for the extracted first element and a second field for a response example derived from the past response;

receiving a new inquiry having a second element, wherein the second element is a new empathy object;

determining that the first element and the second element match;

identifying a response template based on matching the empathy object to the response example and then matching a keyword within the response example to the response template;

generating, by the one or more computer processors, the new response based on the identified template, wherein the generated new response incorporates the second element; and outputting an automated response based on the generated new response, wherein the automated response is outputted by an automatic response computer system.

2. The method of claim 1, wherein the second element indicates that the new response shows empathy for a past matter of an inquirer who has made the new inquiry.

3. The method of claim 1, further comprising:

extracting, by the one or more computer processors, the first element from the past response; and responsive to determining that the first element is similar to the past inquiry, generating, by the one or more computer processors, the model used to estimate the second element based on the first element.

4. The method of claim 3, wherein the generating the model the model used to estimate the second element based on the first element, comprises:

determining, by the one or more computer processors, whether the first element is similar to the past inquiry, by comparing a part of the first element with a part of the past inquiry using an ontology.

5. The method of claim 3, further comprising:
responsive to determining that the first element is not correlated with a remaining element other than the first element in the past response, generating, by the one or more computer processors, the model used to estimate the second element based on the first element.

6. The method of claim 1, wherein generating the model used to estimate the second element in a new inquiry, comprises:
generating, by the one or more computer processors, the model used to estimate the second element based on certainty information indicating a certainty that the past response shows empathy for the past inquiry.

7. The method of claim 6, further comprising:
responsive to determining that the past response satisfies an inquirer making the past inquiry, changing, by the one or more computer processors, the certainty information to indicate a higher certainty.

8. The method of claim 1, wherein generating the new response comprises:
generating, by the one or more computer processors, the new response using a third element obtained from the second element using an ontology.

9. A computer program product for generation of a response to an inquiry, comprising:
one or more computer readable storage media and program instructions stored on the one or more computer readable storage media, the program instructions comprising:
program instructions to extract a first element from a pair including a past inquiry and a past response, wherein the first element is an empathy object that indicates that the past response shows empathy for the past inquiry, wherein the past inquiry is from a plurality of past inquiries and the past response is from a plurality of past responses, wherein the past inquiry and the past response each include a voice pitch and a voice speed, and wherein extracting the first element is based, in part, on the voice pitch and voice speed of the past inquiry and the past response;
program instructions to generate, by one or more computer processors, an empathy object table, wherein a row of the generated empathy object table corresponds with the extracted first element, and wherein the row contains a first field for the extracted first element and a second field for a response example derived from the past response;
program instructions to receive a new inquiry having a second element, wherein the second element is a new empathy object;
program instructions to determine that the first element and the second element match;
program instructions to identify a response template based on matching the empathy object to the response example and then matching a keyword within the response example to the response template;
program instructions to generate, by the one or more computer processors, the new response based on the identified template, wherein the generated new response incorporates the second element; and
outputting an automated response based on the generated new response, wherein the automated response is outputted by an automatic response computer system.

10. The computer program product of claim 9, wherein the second element indicates that the new response shows empathy for a past matter of an inquirer who has made the new inquiry.

11. The computer program product of claim 9, wherein the program instructions stored on the one or more computer readable storage media further comprise:
program instructions to extract the first element from the past response; and
program instructions to, responsive to determining that the first element is similar to the past inquiry, generate the model used to estimate the second element based on the first element.

12. The computer program product of claim 11, wherein program instructions to generate the model the model used to estimate the second element based on the first element, comprise:
program instructions to determine whether the first element is similar to the past inquiry, by comparing a part of the first element with a part of the past inquiry using an ontology.

13. The computer program product of claim 11, wherein the program instructions stored on the one or more computer readable storage media further comprise:
program instructions to, responsive to determining that the first element is not correlated with a remaining element other than the first element in the past response, generate the model used to estimate the second element based on the first element.

14. The computer program product of claim 9, wherein the program instructions to generate the model used to estimate the second element in a new inquiry, comprises:
program instructions to generate the model used to estimate the second element based on certainty information indicating a certainty that the past response shows empathy for the past inquiry.

15. The computer program product of claim 14, wherein the program instructions stored on the one or more computer readable storage media further comprise:
program instructions to, responsive to determining that the past response satisfies an inquirer making the past inquiry, change the certainty information to indicate a higher certainty.

16. The computer program product of claim 9, wherein the program instructions to generate the new response comprise:
program instructions to generate the new response using a third element obtained from the second element using the ontology.

* * * * *